United States Patent

Farkas

[11] Patent Number: 5,950,804
[45] Date of Patent: Sep. 14, 1999

[54] CONVEYOR PROPULSION SYSTEM

[76] Inventor: Shmuel Farkas, Moshav Ein Ayala, Hof Hacarmel, Israel

[21] Appl. No.: 08/845,952

[22] Filed: Apr. 30, 1997

[30] Foreign Application Priority Data

May 2, 1996 [IL] Israel ......................................... 118123

[51] Int. Cl.$^6$ .................................................. B65G 15/14
[52] U.S. Cl. .................................... 198/626.1; 198/626.6; 198/726
[58] Field of Search ................................ 198/726, 626.1, 198/626.2, 626.5, 402, 406, 626.6

[56] References Cited

U.S. PATENT DOCUMENTS

| 4,479,574 | 10/1984 | Julius et al. | 198/626.1 |
| 4,802,571 | 2/1989 | Born et al. | 198/626.1 |
| 5,492,216 | 2/1996 | McCoy et al. | 198/626.5 |
| 5,553,698 | 9/1996 | Patois et al. | 198/626.1 |
| 5,573,103 | 11/1996 | Novak et al. | 198/626.1 |

FOREIGN PATENT DOCUMENTS

| 0 165 127 A1 | 12/1985 | European Pat. Off. . | |
| 0 415 154 A1 | 3/1991 | European Pat. Off. . | |
| 0 466 278 A1 | 1/1992 | European Pat. Off. | 198/626.1 |
| 2683213 | 5/1993 | France . | |
| 2174352 | 11/1986 | United Kingdom . | |
| WO 96/05127 | 2/1996 | WIPO . | |
| WO 97/10163 | 3/1997 | WIPO . | |

OTHER PUBLICATIONS

European Search Report, Application No. EP 97 30 3025, dated Jun. 5, 1998.

Primary Examiner—Joseph E. Valenza
Assistant Examiner—Patrick Mackey
Attorney, Agent, or Firm—Kohn & Associates

[57] ABSTRACT

A propulsion system for a conveyor for the transportation in single file of uniform items such as fillable containers which have a neck portion. In one embodiment, the containers are supported by suitable neck-support means such as an integral ring on static rails. The propulsion system comprises means for generating momentum and suitable transfer means for transferring the momentum thus generated to the containers. The transfer means comprises means for applying mechanical force to the said containers.

20 Claims, 8 Drawing Sheets

CONVEYOR PROPULSION SYSTEM

INTRODUCTION

The transportation of fillable containers such as non-refillable polyethylene bottles, used extensively in the soft-drinks bottling industry is usually effected during the filling process by means of conveyors. In general, each container, once it is filled with contents, is usually in stable equilibrium if supported at its base, and may therefore be transported on conveyors which provide a base-support for each said container. However, when either empty or only partially filled, said containers may exhibit a low weight-to-height ratio and therefore be in a state of unstable equilibrium, and thus tend to topple over if they are moved while supported only at the base. Hence, transportation of said containers by conveyor means prior to, and also during the actual filling process, particularly from the depalletiser to the rinsing machine, often cannot be effected by conveyor means comprising base-supporting means. The traditional solution to the transportation of empty or partially filled unstable containers by conveyor means has been to support said containers by suitable neck-supporting means while transported in single-file by the said conveyor means. Commonly, said neck-supporting means comprise a support ring integrally designed into the neck portion of each container, immediately below the molded screw-thread section thereof onto which the container cap is screwed. The corresponding conveyor means comprises a special static rail structure which supports and guides the containers by the neck-supporting means during transportation from one end of the said conveyor means to the other end. The neck-supported containers are transported along the conveyor means by means of an air-propulsion system generally comprising a plurality of nozzles which direct air streams directly onto the containers, thereby transferring momentum to the containers. However, the air-propulsion system has a number of inherent disadvantages, including the following:

(i) air-borne pollutants are often introduced into the containers, notwithstanding extensive use of air-filters;

(ii) high noise pollution originating from the air-streams and also from the knocking of bottles against each other during the transport process, since the motion of the containers cannot be precisely controlled.

(iii) "snagging", wherein one or more containers may rotate about the area of contact with the said static rail structure while being transported, sometimes causing a blockage, and stopping the flow of containers along the conveyor, (iv) high energy cost associated with the generation of the said air streams, the air-filtering process, and inefficiencies due to air-leakage, resulting in high operating costs.

An object of the present invention is to provide a conveyor propulsion system for the transport of neck-supported containers, wherein the said conveyor propulsion system, substantially overcomes the aforesaid disadvantages associated with air-propulsion systems.

The present invention thus relates to a propulsion system for the transportation of containers in single-file in a conveyor, characterized in that the said propulsion system comprises generation means for the generation of momentum and suitable transfer means for the transfer of said momentum from said generation means to the said containers, wherein the said transfer means comprises means for applying mechanical force to the said containers, thereby substantially eliminating the aforesaid problems inherent in the aforesaid air-propulsion systems in the art.

It is a further object of the present invention to provide an alternative conveyor propulsion system for transporting uniform items, i.e., items of uniform shape and size.

It is a further object of the present invention to provide a conveyor propulsion system suitable for rectilinear runs and/or curved runs.

It is a further object of the present invention to provide an alternative conveyor propulsion system for transporting neck-supported containers and/or uniform items.

It is a further object of the present invention to provide an alternative conveyor propulsion system for transporting containers and/or uniform items which are base-supported.

It is a further object of the present invention to provide an alternative conveyor propulsion system for transporting neck-supported containers and/or uniform items, wherein said conveyor propulsion system may be readily retrofittable on existing conveyors which use an air-propulsion system.

It is a further object of the present invention to provide an alternative conveyor propulsion system for transporting neck-supported containers and/or uniform items which allows the flow rate of containers and/or uniform items, respectively, at any part of the conveyor means thereof to be controlled.

It is a further object of the present invention to provide a modular conveyor propulsion system for transporting neck-supported containers and/or uniform items.

SUMMARY OF THE INVENTION

A propulsion system for the transportation of containers in single-file in a conveyor wherein said containers comprise a neck portion and are supported by neck-support means, and/or for the transportation of uniform items in a conveyor, and/or for the transportation of uniform items in a conveyor wherein said uniform items comprise a neck portion and are supported by neck-support means, and characterized in that the said propulsion system comprises generation means for the generation of momentum and suitable transfer means for the transfer of said momentum form said generation means to the said containers and/or uniform items, wherein the said transfer means comprises means for applying mechanical force to the said containers and/or uniform items.

DESCRIPTION

The present invention relates to an propulsion system for the transportation of containers in single-file in a conveyor, wherein said containers comprise a neck portion and are supported by neck-support means, and characterized in that the said propulsion system comprises generation means for the generation of momentum and suitable transfer means for the transfer of said momentum from said generation means to the said containers, wherein the said transfer means comprises means for applying of mechanical force to the said containers.

In particular, said neck-support means comprise a suitably supported parallel pair of substantially horizontal static flanges having facing edges defining a parallel gap therebetween, said gap being correlated to the width of said neck portion including a suitable clearance, said neck portion comprising a ring portion of width substantially greater than said width of said neck portion including said clearance, said containers being supported via loadbearing contact of said ring portion on said neck-support means. Furthermore, at least one portion of said parallel flanges may comprise substantially rectilinear facing edges, and/or at least one portion of said parallel flanges comprise curved facing edges, wherein, optionally, said facing edges define an outer and an inner parallel arcs of corresponding concentric circles, said circles being on horizontal plane.

Although the problems addressed by the present invention have been historically related to the bottling industry, and in particular to the soft-drinks bottling industry, the present invention is considered to be applicable to all types of conveyor means for transporting all types of uniform items, i.e., items of uniform size and shape, in single-file, and particularly, to containers which are neck-supported while transported in said conveyor means.

The invention will be better understood from a number of embodiments thereof with reference to the appended figures, beginning with a description of each component of each embodiment.

Figure 1:
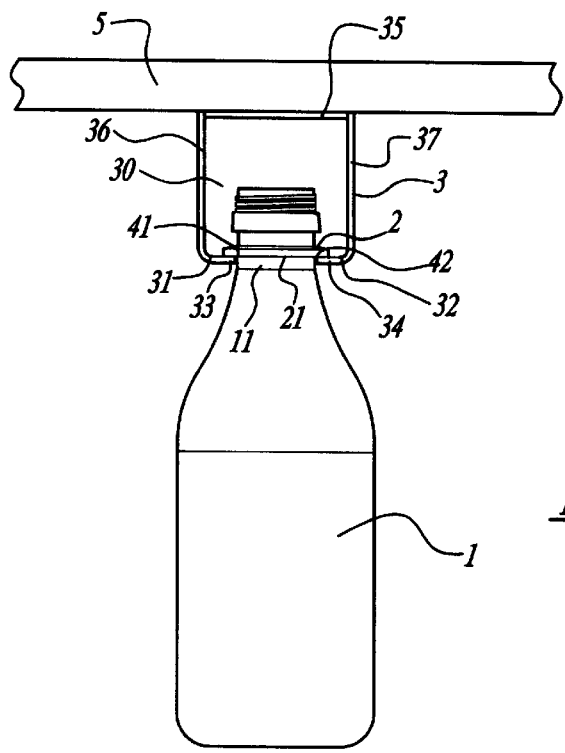
FIG. 1 illustrates, in transverse cross-sectional view, atypical conveyor rail structure in the art wherein typical containers are supported by neck-supporting means and transported in single file.
Figure 2:
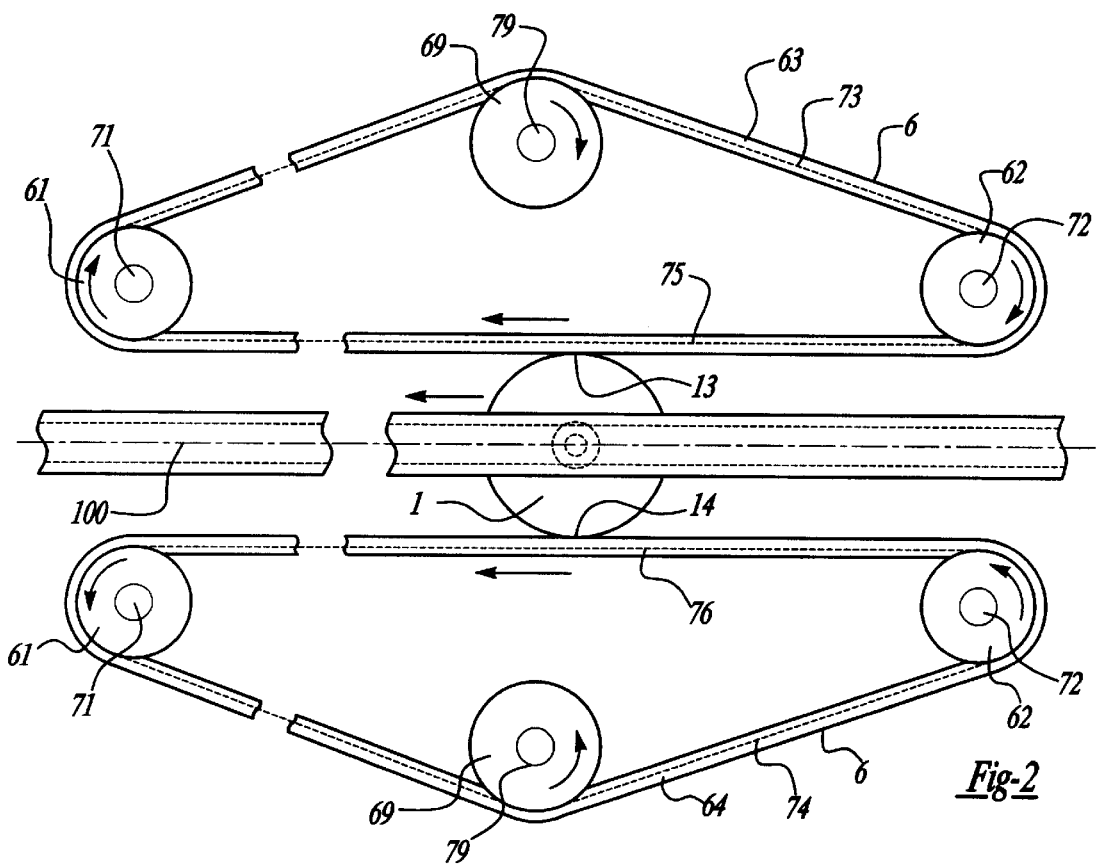
FIG. 2 illustrates, in plain view, the general components and layout of an embodiment of the invention comprising an endless moving-belt arrangement.

FIG. 1 represents atypical container (1) in the art, capable of being supported by neck-support means. The said container is characterized by an annular ring (2) at or near the base of the neck portion (11) thereof, wherein said annular ring defines a bottom annular planar face (21). The said annular ring (2) is commonly integral with the said neck portion (11), but may also be releasably attached to same. Typical conveyor means for the transportation of said containers is characterized by a static conveyor rail structure (3) which is mounted by suitable mounting means to a conveyor support structure (5). Said suitable mounting means are known in the art and may comprise bolting or welding the said conveyor rail structure (3) onto the conveyor support structure (5). The said conveyor rail structure (3) commonly comprises a generally rectangular transverse cross-section (30), comprising a partially open lower wall (34), consisting of two substantially narrow parallel longitudinal lower flanges (31) and (32), having parallel facing edges (41) and (42), respectively, defining a parallel gap (33) therebetween. Each said flange (31), (32) is connected to an upper wall (35), via two substantially parallel walls (36) and (37) generally perpendicular to the said lower flanges. The said parallel walls (36) and (37) are connected one each to the outer edges of the flanges (31) and (32), respectively, and to the upper wall (35), wherein the said upper wall is commonly parallel to the lower wall (34) and of substantially of equal width. The said containers are supported on the said conveyor rail structure (3) by means of the said annular ring (2), wherein the lower planar face (21) thereof is in contact with each of the flanges (31) and (32), as shown in FIG. 1. The internal dimensions of the said cross-section provide adequate clearance for the neck-portion of the said containers, upwards of the annular ring, and the widths of the lower flanges (31) and (32) and of the gap (33) are of suitable dimensions to accommodate with adequate clearance the neck portion of each container protruding below the said annular ring (2), simultaneously ensuring adequate overlap of the said annular ring (2) over the said flanges (31) and (32), as each container is transported in single file in the said conveyor rail structure (3).

Typically, the containers move relative to the lower flanges (31) and (32), while being supported thereon. Thus, the said lower flanges (31) and (32) act as static support and guide rails on which the said containers are transported from one end of the conveyor to the other end. Typically, the lower flanges (31) and (32) are horizontally aligned, and the parallel walls (36) and (37) are vertically aligned. Furthermore, the longitudinal axis (100) of the rail section is usually rectilinear, though may contain curved portions, according to the geometry and layout of the conveyor while maintaining the integrity of the described support rail cross-section throughout.

The present invention also relates to a propulsion system for a conveyor, wherein said mechanical force is a frictional force acting on an area of contact between the said containers and an endless moving belt arrangement.

Thus, in a first embodiment of the invention, the transfer of forward momentum to each container (1) is achieved by frictional force acting on the area of contact between the said container (1) and an endless moving-belt arrangement (6).

The present invention also relates to a propulsion system for a conveyor wherein said endless moving belt arrangement comprises endless moving belts looped around terminal pulleys.

Thus, the said endless moving-belt arrangement (6) comprises at least one pair of endless moving belts (63) and (64) located alongside the said conveyor rail structure (3), wherein each endless moving-belt (63) and (64) is looped around at least a first and a second suitable co-rotational terminal pulleys, (61) and (62) respectively, wherein there is substantially no slippage between the said terminal pulleys, (61) and (62), and each corresponding endless moving-belt (63) and (64) during conveyor motion. The said terminal pulleys (61) and (62) are located one at each longitudinal end of each of the corresponding closed circuits (73) and (74) described by each endless moving-belt (63) and (64) respectively. Preferably, terminal pulleys (61) and (62) corresponding to each of the said endless moving belts, (63) and (64), are positioned in a transverse facing relationship on opposite sides of the said conveyor longitudinal axis (100). For each endless moving-belt (63) and (64), each corresponding terminal pulley (61) and (62) thereof is mounted on a turning shaft, (71) and (72). Respectively each endless moving-belt (63) and (64) may be further looped around a third pulley (69) mounted on a turning shaft (79), wherein said turning shaft (79) is turned by power originating from means for generating momentum. Each shaft is mounted onto the said conveyor support structure (5) by suitable mounting means the art, as described hereinafter. Said means for generating momentum are known in the art, and may comprise, in a preferred embodiment, and electrical motor. Alternatively, said suitable momentum generation means may comprise an air motor, or alternatively an internal combustion engine, or alternatively a turbine powered by the combustion of gases or by natural means. Said momentum generation means provides power either directly or indirectly, by suitable transfer means, to turn said pulley (69), thereby transferring angular momentum to said pulley (69). Suitable transfer means are known in the art and may comprise means wherein the said shaft (79) is mounted directly onto the said motor. Alternatively, said suitable transfer means may comprise a suitable gear-box arrangement suitably mounted between the motor and the said shaft (79), or alternatively may comprise a pulley suitably mounted on the motor and a second pulley mounted on the said shaft (79), wherein an endless moving-belt looped around the said pulleys transfers momentum form the motor to the said shaft (79). The angular momentum thus transferred to each said pulley (69) is then transferred to the corresponding endless moving-belts (63) and (64) in the form of linear momentum, which is then subsequently transferred as angular momentum to the corresponding terminal pulleys (61) and (62) around which each endless moving-belt (63) and (64) is looped. Alternatively, said momentum generation means may transfer angular momentum directly or indirectly, as hereinbefore described, to at least one terminal pulley (61) and/or (62) on each of the said endless moving belts (63) and (64), wherein angular momentum is transferred from each of the said terminal pulleys (61) and/or (62) to the said corresponding endless moving belts (63) and (64) in the form of linear momentum.

Each of the said endless moving belts (63) and (64) describes a closed circuit, (73) and (74) respectively, wherein each said circuit (73) and (74) comprises at least one longitudinal part, (75) and (76) respectively, wherein said longitudinal parts (75) and (76) are located substantially opposite each other, and wherein said longitudinal parts are substantially parallel to each other and also substantially parallel to the longitudinal axis (100) of the conveyor rail structure (3). The said longitudinal parts (75) and (76) are located below the said conveyor rail structure (3), and transversely on opposite sides of the said conveyor rail structure longitudinal axis (100). The said longitudinal parts (75) and (76) are transversely spaced relative to each other and to the said conveyor rail structure to provide adequate, and preferably optimal contacts between each said container (1), when supported at the conveyor rail structure (3) as hereinbefore described, and each of the said endless moving belts (63) and (64) carried along the longitudinal parts (75) and (76) of the circuits.

The endless moving-belts (63) and 64) thus each exert a normal reaction force on each said container (1) at the corresponding areas of contact, (13) and (14) respectively, and corresponding frictional forces are generated at the said areas of contact in a direction opposite to the direction of motion of each endless moving belt (63) and (64) in the longitudinal parts (75) and (76) of the said circuits. For any suitable combination of materials from which the containers (1) and endless moving belts (63) and (64) are made, the higher the said normal reaction, the greater the corresponding frictional force that is generated by the movement of each of the said endless belts (63) and (64). The frictional force thereby generated as each endless moving belt moves by virtue of the linear momentum therein substantially prevents relative movement between each of the said endless moving belts (63) and (64) and each of the containers (1) in contact with same. Thus, linear momentum is transferred from the said endless moving belts (63) and (64) to the said containers (1), allowing the said containers to move relative to the static conveyor rail structure (3) wherein the said annular ring (2) of each container (1) slides over the said longitudinal flanges (31) and (32), resulting in the transportation of the said containers (1) along a part of the conveyor rail section (3) defined by the longitudinal extent of the longitudinal parts (75) and (76) of the circuits described by the said endless moving-belts (63) and (64) respectively.

Thus the endless moving-belt (63) and (64) counter-rotate with respect to each other within their respective closed circuits (73) and (74), and the portion of each said endless moving belt (63) and (64) located on the longitudinal parts (75) and (76) of the said closed circuits (73) and (74) respectively, move in the same direction, along the preferred direction of flow of the containers (1) along the conveyor means. The rates of rotation of the said endless moving belts (63) and (64) are preferably substantially equal, and this may be accomplished by means available in the art. Such means may comprise using one momentum generating means to provide momentum to both endless moving-belts (63) and (64). However, there may be a differential in the rates of rotation of the two endless moving-belts (63) and (64), which may result in each container (1) being rotated as it is transported along the said conveyor means. The applicant has also found that the transportation of containers (1) using the said endless moving-belt arrangement can substantially reduce container "snagging".

The present invention also relates to a propulsion system for a conveyor wherein said endless moving belts are made from synthetic or natural materials.

Thus, endless moving-belt (63) and (64) is made from any suitable material, which may be synthetic or natural, and which is preferably flexible, strong, durable and partially elastic, and preferably exhibit a high coefficient of friction with respect to the material of the containers (1). Suitable materials are known in the art, comprising for example rubber, and synthetic polymers and resins, such as, for example, polypropylene. Preferably, the said endless moving belts (63) and (64) may have any suitable cross-sectional shape which are known in the art, and said suitable shape may comprise for example a circular cross-section, or alternatively a trapezoidal cross-section. Additionally, the said endless moving-belts (63) and (64) may be substantially smooth or alternatively, the said endless moving-belts (63) and (64) may be toothed.

The present invention further relates to a propulsion system for a conveyor wherein said propulsion system is retrofittable on existing conveyors.

Figure 3:
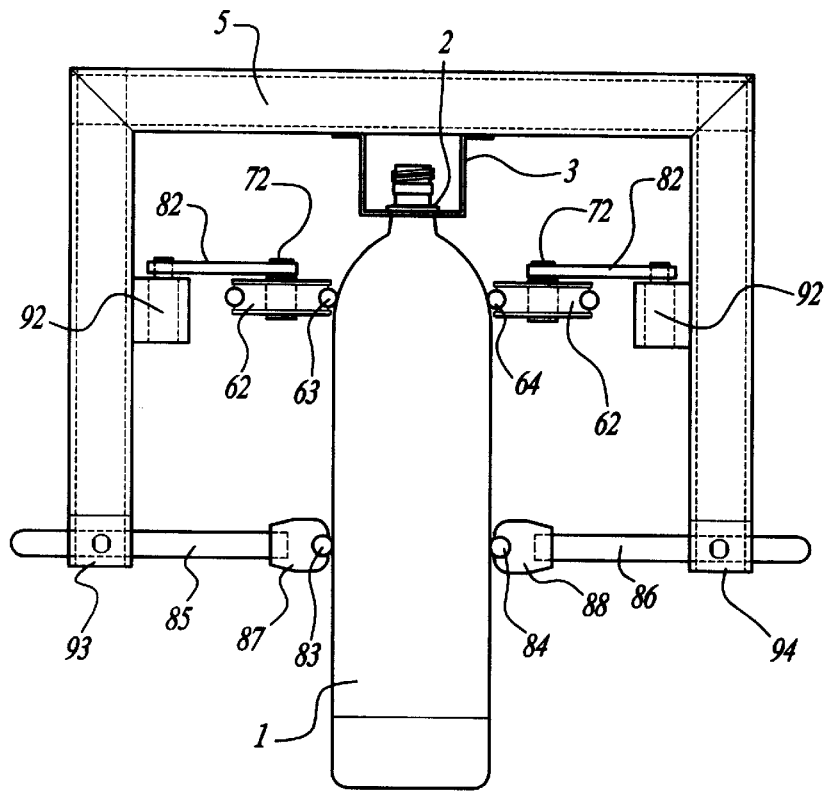
FIG. 3 illustrates, in transverse cross-sectional view, he general components and layout of an embodiment of the invention comprising an endless moving-belt arrangement.

With further reference to FIG. 3, in one form of the invention comprising an endless moving-belt arrangement (6), each terminal spool (61) and (62) is mounted onto the conveyor rail support structure (5) by suitable mounting means known in the art. In a preferred form of the invention, said suitable mounting means may further comprise suitable retrofitting means, wherein said embodiment of the invention may be installed on existing conveyors which may previously have been operated using an air-propulsion system. Said suitable retrofitting means are known in the art and may comprise adapting the said suitable mounting means to an existing conveyor rail support structure. Said suitable mounting means may comprise a mounting brackets (92) mounted onto the said rail support structure (5), wherein a strut (82) mounted on said mounting bracket (92) supports the shaft (71), and similarly shaft (72), by means, of a suitable bearing arrangement. Alternatively, the shaft (71), and similarly shaft (72), may be rigidly mounted onto said strut (82), and mounted onto the corresponding terminal pulley (61) and (62) respectively by means of a suitable bearing arrangement.

Figure 4:
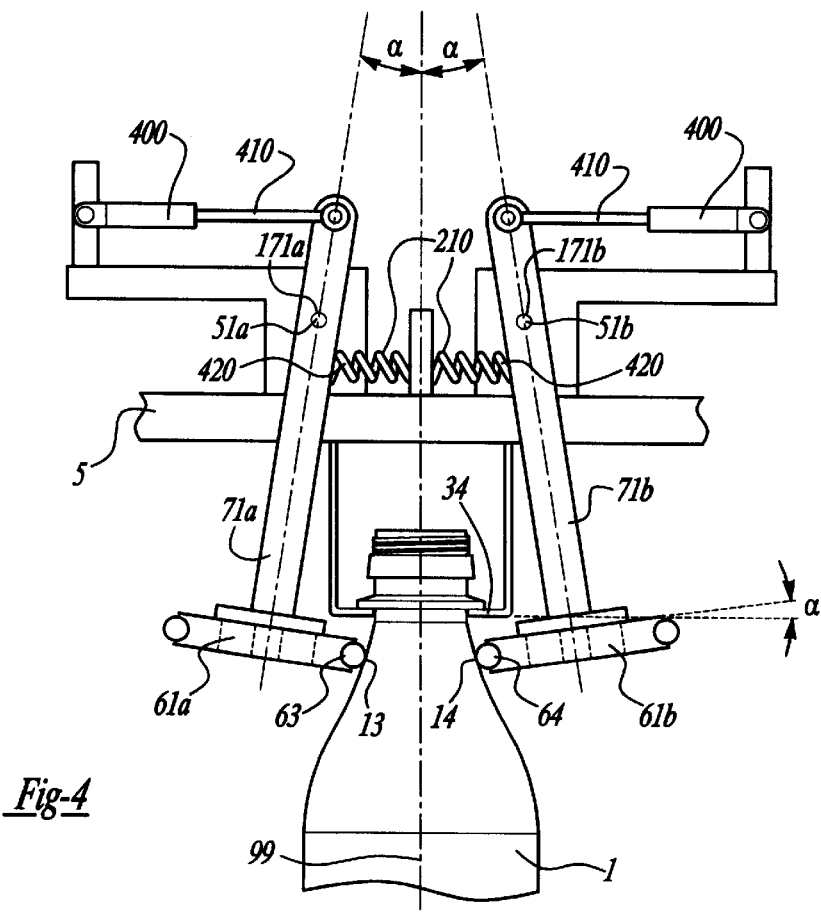
FIG. 4 illustrates, in transverse cross-sectional view, the general components and layout of a preferred form of the invention comprising an endless moving-belt arrangement.

Container "snagging" may be further countered in a preferred embodiment of the invention, shown in FIG. 4. In this embodiment, the said endless moving belts (63) and (64) are each looped around at least two terminal pulleys (61a), and (62b) and (61b) and (62b), respectively, wherein for each said endless moving belts (63) and (64), corresponding terminal pulleys (61a) and (61b), and (62a) and (62b), are mounted dihedrally at an angle (a) relative to the open lower wall (34) of the conveyor rail structure (3), wherein corresponding terminal spools (61a) and (61b), and (62a) and (62b), are mounted symmetrically about a vertical datum (99) through the longitudinal axis (100) of the said conveyor rail structure (3).

Thus, the corresponding shafts (71a) and (72a), and (71b) and (72b), onto which the said terminal pulleys (61a), (62a), (61b) and (62b), respectively, are mounted, are also symmetrically dihedrally positioned at an angle (α) relative to the said datum (99). Each said shaft (71a), (72a), (71b) and (72b) is supported and pivoted, by suitable supporting and pivoting means known in the art, above each corresponding terminal pulley, (61a), (62a), (61b) and (62b), respectively, at pivotal points (51a), (52a), (51b) and (52b) respectively. Said suitable supporting and pivoting means may comprise for example a mounting support member (50), mounted by suitable means onto the conveyor support structure (5) above the said conveyor rail structure (3), whereupon each shaft (71a), (72a), (71b) and (72b) is mounted onto corresponding pins (171a), (172a), (171b) and (172b), respectively, on the said support member (50). Preferably, the said supporting and pivoting means allows partial transverse rotation for each said shaft (71a), (72a), (71b) and (72b) about each corresponding pivotal point (51a), (52a), (51b) and (52b) respectively. Suitable tension means (200) are mounted between each facing pair of said shafts, (71 a) and (71 b), and (72a) and (72b), respectively, thereby substantially ensuring that the corresponding longitudinal sections (75) and (76) of the said endless moving belts (63) and (64), respectively, between each corresponding pairs of terminal pulleys (61a) and (62a), and (61b) and (62b), respectively, are in optimal contact with each container (1) in contact with said endless moving-belts (63) and (64). Said suitable tension means (200) may comprise a suitable spring (210) mounted to each facing pair of said shafts, (71a) and (71b), (72a) and (72b), respectively, wherein the mounting point on each said shaft is between the corresponding pivotal point, (51a), (51b), (52a) and (52b), respectively, and the corresponding terminal pulley, (61a), (61b), (62a) and (62b), respectively. The dihedral angle may be adjusted by any suitable means including, for example, correspondingly adjusting the length of each shaft (71a), (71b), (72a) and (72b). respectively, between each corresponding terminal pulley (61a), (61b), (62a) and (62b), respectively, and each corresponding pivotal point, (51a), (51b), (52a) and (52b), respectively.

The area of contact (13) and (14) between each endless moving belt (63) and (64) respectively and the containers (1) is chosen somewhere along the height of the said containers (1), defined from below the said annular ring (2) to the bottom of the said container, though preferably, it is approximately located on the upper-half of the said height, and preferably still within the upper 20% of the said height.

The present invention also relates to a propulsion system for a conveyor further comprising means for disengaging said endless moving-belt.

Thus, a preferred form of the invention comprising an endless moving belt arrangement (6), as hereinbefore described, further comprises suitable disengagement means (400) for disengaging said endless moving belts. Said disengagement means (400) enable each endless moving belt (63) and (64) to disengage from contact with said containers (1), thereby enabling said momentum means to continue generating and transferring momentum to the said endless moving belts (63) and (64), while effectively halting the flow of containers (1) along the said conveyor. Said suitable endless moving belt disengagement means (400) are known in the art, and may comprise, for example, a suitable jack and return spring arrangement (405) suitably mounted onto each terminal pulley shaft, either above, or alternatively below, the corresponding said pivotal point. Thus, when each jack (410) is actuated, the corresponding shaft, and therefore the corresponding terminal pulley mounted onto said shaft, is deflected away from the conveyor rail structure (3), thereby disengaging the corresponding endless moving belt from contact with the containers (1). When the said jack (410) is released, the said return spring (420) returns the corresponding pulley shaft, and its corresponding pulley to its original location, thereby re-engaging the corresponding endless moving belt onto the said containers (1), thereby re-instating the flow of containers (1) along the conveyor. Preferably, the said suitable jack and return spring arrangement (405) mounted on all terminal pulley shafts are actuated synchronously.

As shown on FIG. 3, one form of the invention comprising an endless moving belt arrangement (6) may optionally further comprise at least one or preferably two optional longitudinal guide rods (83) and (84), wherein the said longitudinal guide rods are positioned one each on either sides of the said containers, preferably positioned below each endless moving-belt (63) (64). The said longitudinal guide rods (83) and (84) may assist in stabilising long containers, and said longitudinal guide rods (83) and (84) may be fixed or adjustable, and may be mounted to the conveyor support structure (5) by any suitable mounting means available in the art. Said suitable mounting means may comprise for example connecting elements (85) and (86) between corresponding guide clamps (87) and (88) which clamp the corresponding longitudinal guide rods (83) and (84) respectively, and corresponding mounting brackets (93) and (94) mounted onto the said conveyor support structure (5).

The present invention relates to a propulsion system for a conveyor wherein said endless moving-belt arrangement further comprises non-slip means for maintaining the said frictional force.

The normal reaction exerted by each of the said endless moving belts, (63) and (64), onto each container (1) will tend to diminish the further away the said container is from any given pulley, due to sagging of the said continuous belt between each corresponding pair of terminal pulleys, (61) and (62), and consequently, when the said endless moving-belts (63) and (64) are in motion, the frictional force between each endless moving-belt, (63) and (64), and each container (1) will similarly diminish, and thus the said container (1) may slip relative to the said endless moving-belts (63) and (64). Suitable non-slip means (300) are provided to maintain the magnitude of the said frictional force between each of the endless moving-belts, (63) and (64), and each container (1) in contact with same, within acceptable parameters, to substantially eliminate slippage between the said endless moving-belts, (63) and (64), and the said container (1).

Said non-slip means (300) may comprise adjusting the tension in said endless moving-belts by suitable tension adjusting means. Tension adjusting means are known in the art and may comprise, for example, looping each said endless moving belt, (63) and (64), around an auxiliary pulley, wherein the said pulley may be moved inwards and/or outwards relative to each of the corresponding said circuits (73) and (74), respectively, thereby decreasing and/or increasing, respectively, the tension in each of the said endless moving belt (63) and (64). Each endless moving-belt, (63) and (64) has an upper tension limit, which is determined by a number of factors including material of the belt, cross sectional shape and area, whereupon if said limit is exceeded could result in each said endless being elastically stretched or torn.

Alternatively, the said non-slip means (300) may comprise mounting the terminal pulleys (61) and (62), corresponding to each endless moving belt (63) and (64), closer to the said datum (99), wherein the gap defined between the longitudinal parts (75) and (76) of the said circuits (73) and (74) respectively, is less than the width of each container (1) defined at the areas of contact (13) and (14), thereby compensating for the said sagging of the said endless moving-belts between each corresponding pair of terminal pulleys (61) and (62). In addition, said terminal pulleys (61) and (62) are mounted on suitable deflection means, whereby each terminal pulley (61) and (62) corresponding to each endless moving belt (63) and (64) is allowed to deflect in order to increase the gap between facing terminal pulleys when each container (1) is transported therebetween. Said suitable deflection means are known in the art and may comprise mounting the said terminal pulleys (61) and (62), corresponding to each endless moving-belt (63) and (64), on suitable pivots, with a suitable return spring suitably mounted to each said terminal pulley.

Figure 5A:
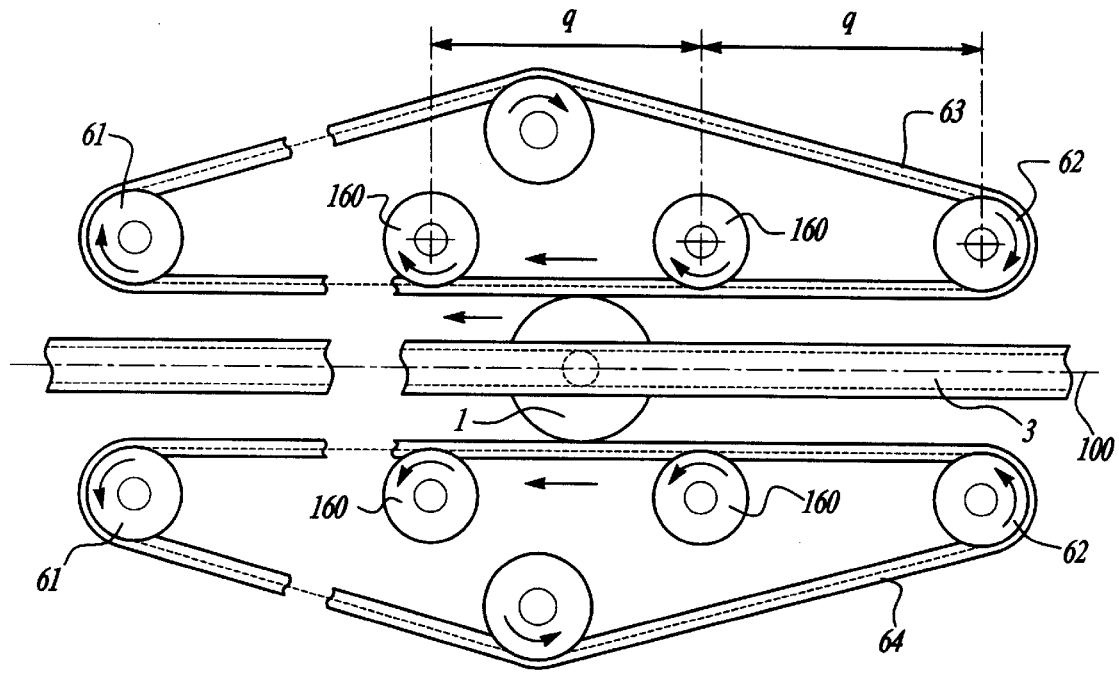
FIG. 5 illustrates, in plan view, alternative non-slip means for an embodiment of the invention comprising endless moving-belts.
Figure 5B:
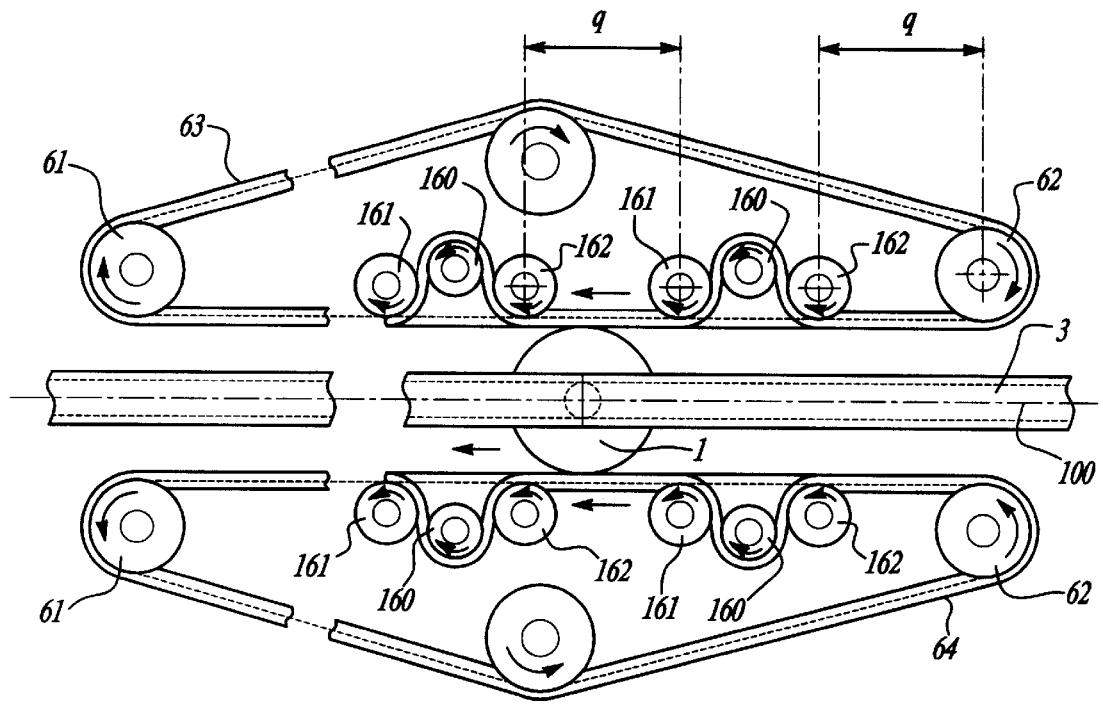

Optionally, the said suitable non-slip means (300) may further comprise looping each endless moving belt, (63) and (64) over a series of corotational auxiliary pulleys (160), situated between the corresponding terminal pulleys (61) and (62), as illustrated in FIG. 5(a), wherein the pitch (q) between consecutive pairs of the said auxiliary pulleys (160) (including each terminal pulley (61) and (62) and its adjacent auxiliary pulley (160)) does not exceed a maximum pitch limit (P), as hereinafter defined. Each auxiliary pulley (160) need only be in contact with each endless moving belt (63) and (64) on the corresponding longitudinal parts, (75) and (76), respectively, of the corresponding closed circuits (73) and (74), respectively. Optionally, the said non-slip means may be further enhanced as follows. With further reference to FIG. 5(b), each auxiliary pulley (160) is flanked longitudinally on either side by another pulley, (161) and (162), respectively. Each said endless, moving belt (63) and (64) is looped around its corresponding terminal pulleys (61) and (62), its corresponding flanking pulleys (161) and (162), and its auxiliary pulleys, (160), wherein the said flanking pulleys (161) and (162) are corotational with each other and the terminal pulleys (61) and (62), and wherein the auxiliary pulleys (160) are counter-rotational with respect to the said pulleys (61), (62), (161) and (162), thereby each auxiliary pulley (160) is located outside the area enclosed by the corresponding closed circuits (75) and (76). Since it is disadvantageous to permit contact between each container (1) and each auxiliary pulley (160), the said auxiliary pulleys (160) may be suitably offset transversely away from each corresponding longitudinal section (75) and (76).

Alternatively, the said non-slip means (300) may comprise adjusting the pitch between corresponding pairs of terminal pulleys (61) and (62) in each endless moving-belt (63) and (64) so that said pitch is kept preferably below a maximum pitch limit (P), which is defined as the maximum pitch between adjacent pulleys along which the desired level of friction is still maintained between the corresponding endless moving belt looped around said pulleys and the container in contact with said endless moving belt. Said maximum pitch limit (P) depends on a number of factors including the materials from which the said endless moving belts (63) and (64), and the containers (1) are made, the mass of each container (1), the elasticity of the said endless moving-belts (63) and (64), the rigidity of the walls of the containers (1) particularly in the said areas of contact (13) and (14), particularly a maximum pitch limit (P) of approximately 0.5 meters is suitable for the transportation of typical non-refillable polyethylene bottles used in the soft-drinks industry in a preferred form of the present invention comprising endless moving belts made from polypropylene. The said value of approximately 0.5 meters for the said maximum pitch limit (P) is considered substantially applicable to other types of containers used with endless belts made from different materials, but may be higher or lower, according to each specific combination thereof.

The present invention further relates to a propulsion system for a conveyor wherein the said transfer means are in modular form comprising a plurality of conveyor propulsion modules.

The present invention relates to a propulsion system for a conveyor wherein the said transfer means are in modular form further comprising disengagement means, wherein said disengagement means enable each said conveyor propulsion module (700) to be independently disengaged.

Figure 6:
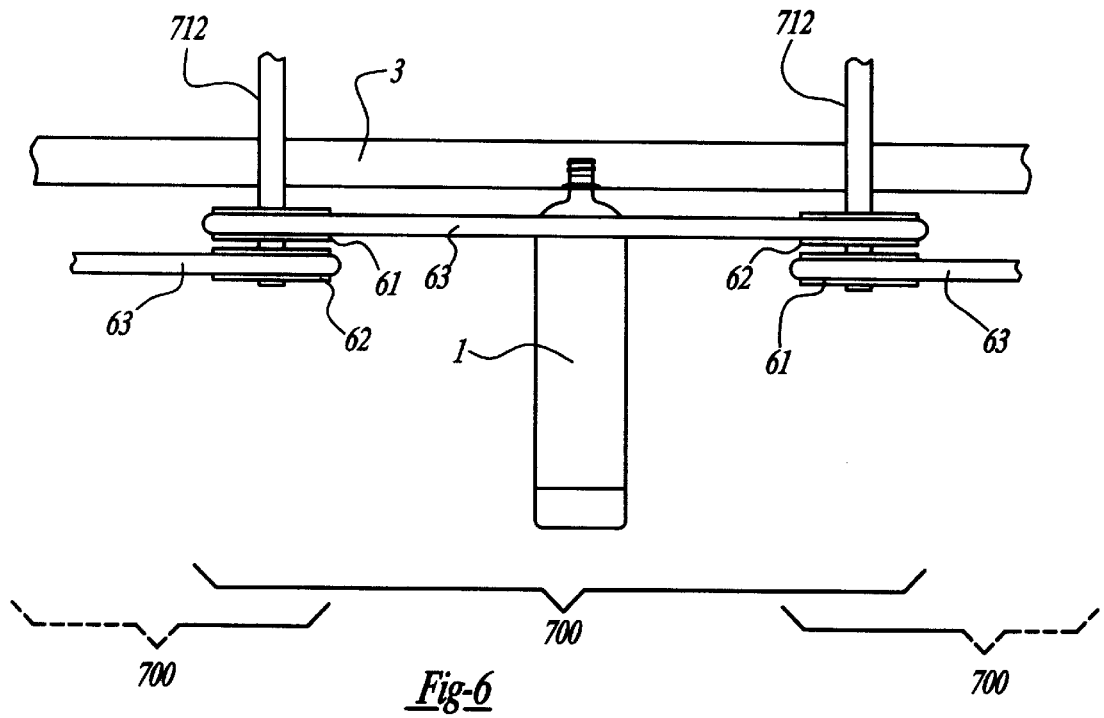
FIG. 6 illustrates, in side-view, the general components and layout of a preferred form of the invention comprising an endless moving-belt arrangement and modular means wherein adjacent conveyor propulsion modules are overlapping mounted.

Thus, in a preferred form of the embodiment, the said conveyor propulsion system is assembled from suitable modular means. Said suitable modular means may comprise a series of conveyor propulsion modules, wherein each said conveyor propulsion module (700) comprises an endless moving belt arrangement (6) mounted onto the rail support structure (5) by suitable and optionally retrofittable mounting means, wherein momentum is transferred to the said endless moving belts (63) and (64) in each said conveyor propulsion module (700) by suitable momentum generation means and suitable transfer means, as hereinbefore described. In a preferred form of the invention comprising conveyor propulsion modules (700), said mounting means further comprises mounting the said terminal pulleys dihedrally, as hereinbefore described. In a preferred form of the invention comprising conveyor propulsion modules, said mounting means further comprises suitable disengagement means (400) for disengaging said endless moving belt, as hereinbefore described. Thus, the installation of the said suitable endless moving belt disengagement means (400) on the said conveyor propulsion modules (700) allows selective disengagement of each said conveyor propulsion modules (700) thereby affording the capability to halt the flow of containers (1) in selected sections of the said conveyor, while permitting other sections of the said conveyor to continue transporting said containers (1), thereby increasing the efficiency, adaptability and effectiveness of the said conveyor. Thus, containers (1) propelled and supplied by operating sections of the conveyor essentially begin to fill up the downstream sections which have been "disengaged", and when full, the containers will effectively spill over into the next downstream section of the conveyor by virtue of the pushing action of the containers (1) one against the another. Each said conveyor propulsion module (700) may optionally further comprise suitable non-slip means (300), as hereinbefore described. In a preferred form of the invention, said non-slip means (300) comprise means for adjusting the pitch between each corresponding pair of terminal pulleys (61) and (62) not to exceed a maximum pitch limit, (P) as hereinbefore described. Thus, each said conveyor propulsion module (700) is mounted longitudinally in series along the conveyor, wherein by varying the pitch between corresponding terminal pulleys for each of the said conveyor propulsion modules (700), it is possible to successfully install said suitable modular means on existing conveyors of any length, comprising not only straight runs but also curved runs. In one form of the invention comprising conveyor propulsion modules (700), each consecutive pair of said conveyor propulsion modules (700) is separated by a suitable longitudinal clearance gap substantially avoiding interference between said pair of conveyor propulsion modules (700). Alternatively, with above reference to FIG. 6, adjacent conveyor propulsion modules (700) may be overlapping mounted on the said conveyor, wherein interference between said adjacent conveyor propulsion modules (700) is substantially avoided by overlappingly mounting the first terminal pulley (61), corresponding to each endless moving belt (62) and (64) of each conveyor propulsion module (700), substantially above, or alternatively below, the second terminal pulley (62) corresponding to each corresponding endless moving belt of the adjacent conveyor propulsion module (700). In a preferred form of the invention, each of the said overlapping pairs of first and second terminal pulleys (61) and (62), respectively, are mounted one above the other on the same terminal pulley shaft (712).

The present invention further relates to a propulsion system for conveyors, wherein at least one portion of said parallel flanges comprise curved facing edges, wherein said facing edges define an outer and an inner parallel arcs of corresponding concentric circles, said circles being on a horizontal plane.

Both said flanges are static, or optionally, the said flange comprising said edge defining said outer arc is static and said flange comprising said edge defining said inner arc may rotate about the center of said concentric circles. Furthermore, said flange comprising said edge defining said inner arc constitutes the circumferential perimeter of an upper surface of a rotatable auxiliary pulley having its center concentric with said center of said concentric circles. At least one of said endless moving belts is further looped around said rotatable auxiliary pulley.

Thus, though the foregoing embodiments are particularly applicable to rectilinear portions of a conveyor, wherein said longitudinal axis (100) thereof is correspondingly rectilinear, they are also applicable portions of a conveyor wherein said longitudinal axis (100) has a relatively large radius of curvature, compatible with maintaining the said moving belts in suitable tension, particularly along the outside run of said curved portions, and with preventing the said moving belts from collapsing inward.

Figure 7:
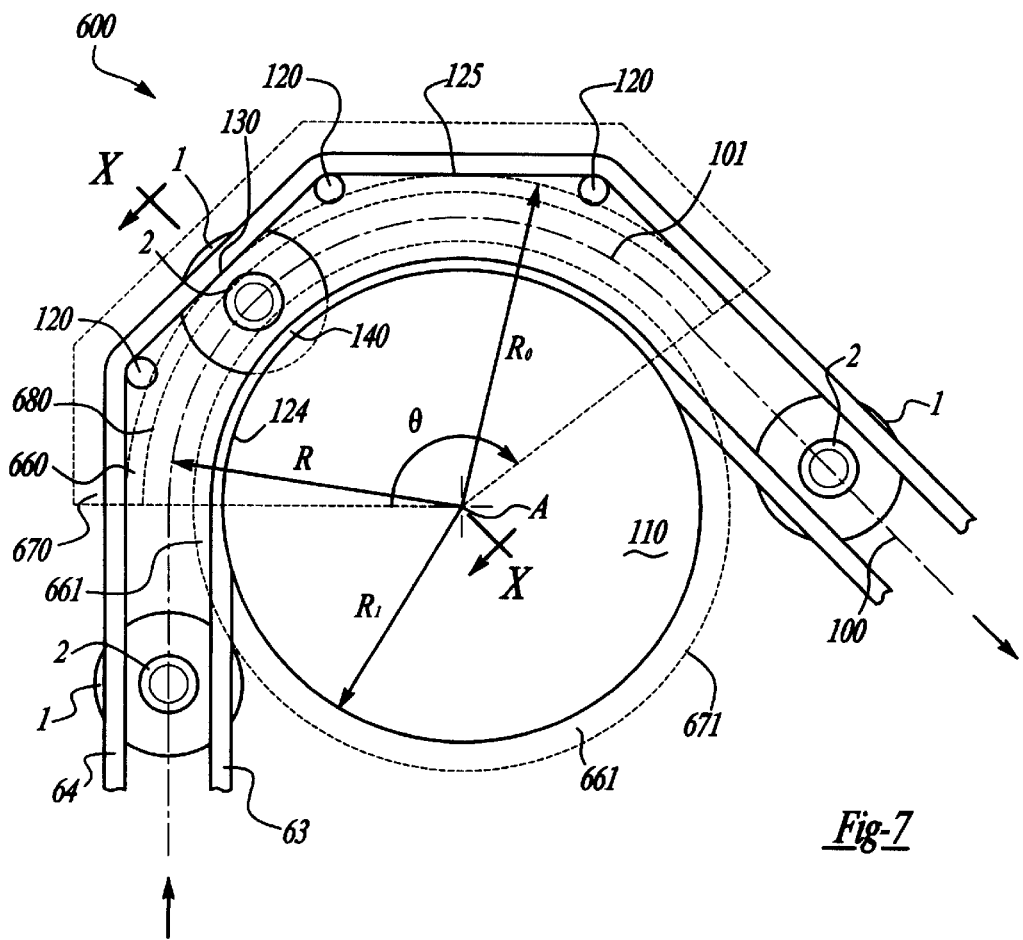
FIG. 7 illustrates, in plan view, the general components and layout of an embodiment of the invention comprising an angular conveyor portion.
Figure 8:
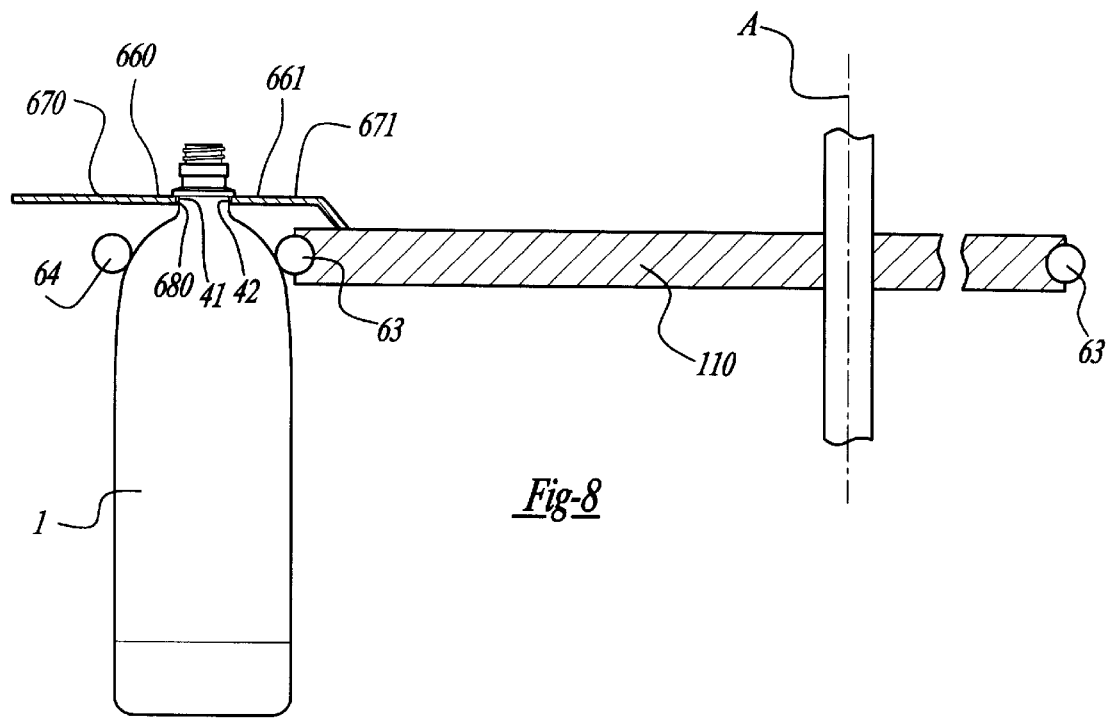
FIG. 8 illustrates a cross-sectional view of the embodiment shown in FIG. 7, taken along X—X.

Another embodiment of the invention, illustrated in FIGS. 7 and 8, comprises an angular conveyor portion (600), particularly suited for curved portions of a conveyor, wherein a curved portion (101) of said longitudinal axis (100) is required to have a relatively small radius of curvature (R) about a centre (A), for a turning angle θ. Typically, angle θ may be 90° or 180°, but may comprise any other angle practically achievable, given the physical constraints of the conveyor. Additionally, a required turning angle may be achieved by connecting in series a plurality of angular conveyor portions, wherein the summation of turning angles provides by each angular conveyor portion provides the said required turning angle. For simplicity, FIG. 7 shows only a portion of the endless moving-belts (63) and (64) in relation to this embodiment, corresponding to a curved portion of a conveyor represented by the embodiments illustrated in FIGS. 2 to 6, for example. In this embodiment, one said endless moving belt, (63) for example, is also looped around an inner arc (124) of an auxiliary pulley (110) having a radius Ri. Said auxiliary pulley (110) is rotatable about its centre, which is at (A), and said inner arc (124) subtends an angle θ at (A). The other endless moving belt, (64) is looped around the outer portions of a series of idlers (120) disposed about an outer arc (125) of an imaginary circle having diameter Ro, wherein said outer arc (125) is concentric with inner arc (124) and also subtends said angle θ at (A). Optionally, at least one of said idlers (120) may be spatially adjustable in order to regulate tension in said endless moving belt (64). Thus, the outer endless moving-belt (64) is prevented from collapsing inwards. The diameter of the idlers (120) and Ro are preferably chosen to provide optimal tangential contact between at least a portion (130) of said endless moving-belt (64) located between each adjacent pair of said idlers (120) and the said containers (1). Alternatively, said idlers may be positioned in a manner preventing substantial contact between said endless moving-belt (64) and said containers (1), wherein momentum is imparted to said containers (1) via contact of said endless moving-belt (63) with said containers (1). Thus, Ri is chosen to ensure adequate contact between each portion (140) of said inner endless moving-belt (63) that is looped around said inner arc (124) of said auxiliary pulley (110) and the said containers (1). The said endless moving-belts (63) and (64) need not have the same angular velocity along arcs (124) and (125) respectively. Thus, while being transported in said angular conveyor portion (600) through angle θ, said containers (1) may additionally be individually rotated. In one form of this embodiment, said neck-support means comprise said conveyor support structure (3), wherein said facing edges (41), (42) herein define concentric arcs of suitable radius to enable said containers (1) to be guided and supported while being transported along said angular portion (101) of said angular conveyor portion (600). In a preferred embodiment of said angular conveyor portion (600), said neck support means comprise an outer static rail (660) and an inner rotatable rail (661). Thus, with reference to FIG. 8, outer static rail (660) may comprise a suitably supported outer plate (670) (shown dotted in FIG. 7) having a circular edge (680) of suitable radius, for example. Inner rotatable rail (661) advantageously comprises a circular flat plate of suitable radius and having a circular outer edge, suitably attached to the upper surface of said auxiliary pulley (110), and concentric and co-rotatable with same. Alternatively, said inner rotatable (661) may comprise an angular flange (671) (also shown dotted in FIG. 7) of suitable inner and outer radii, suitably attached to said auxiliary pulley (110). Advantageously, said outer plate (670) may support said series of idlers (120). Thus, as containers (1) are transported a long said angular conveyor portion (600), said annular support rings (2) on said containers (1) are in load bearing sliding contact with outer static rail (660) and also in load bearing contact with inner rotatable rail (661) which rotates together with auxiliary pulley (110).

Figure 9:
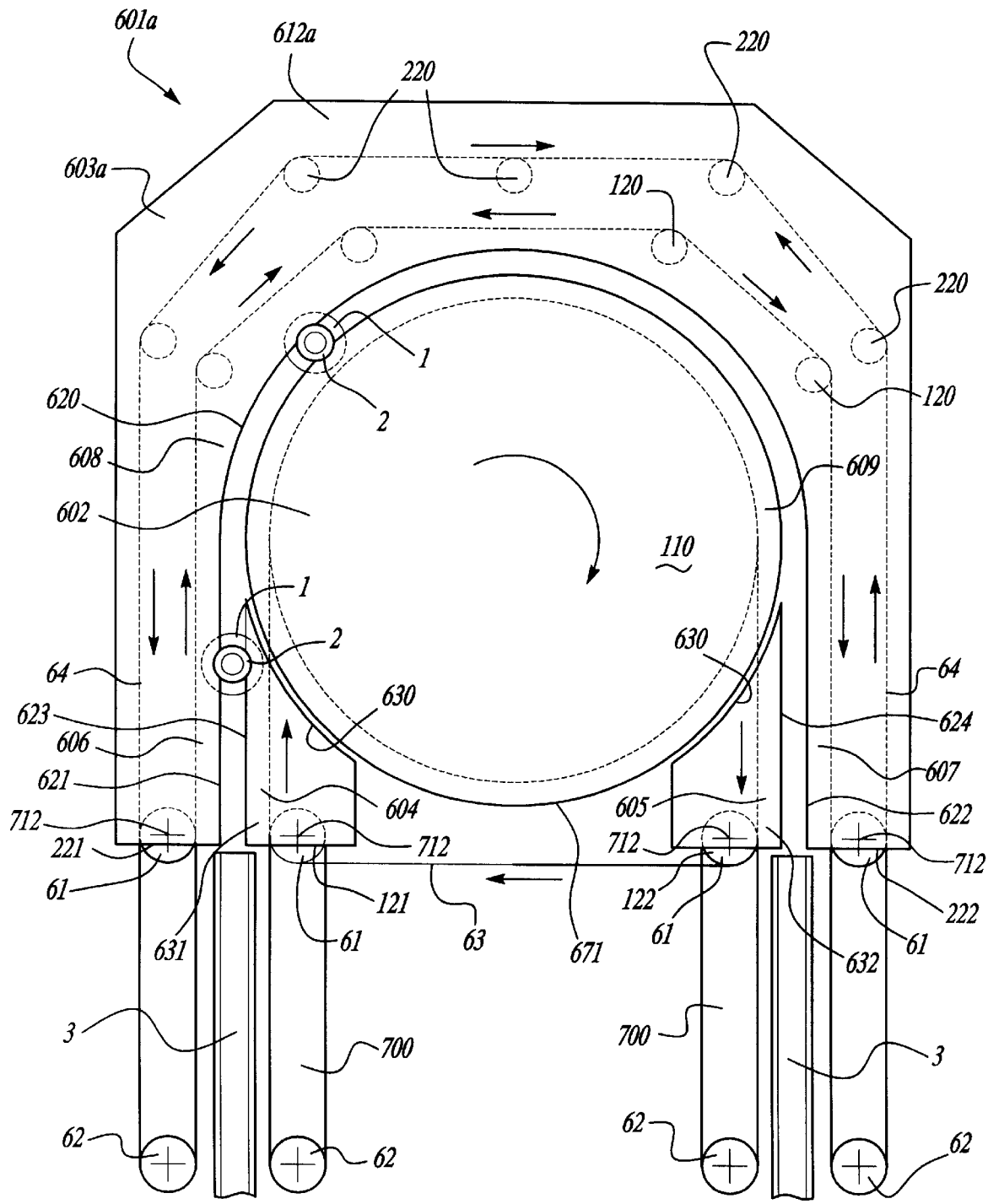
FIG. 9 illustrates, in plane view, the general components and layout of an embodiment of the invention comprising a modular angular conveyor portion comprising a turning angle of 180°.
Figure 10:
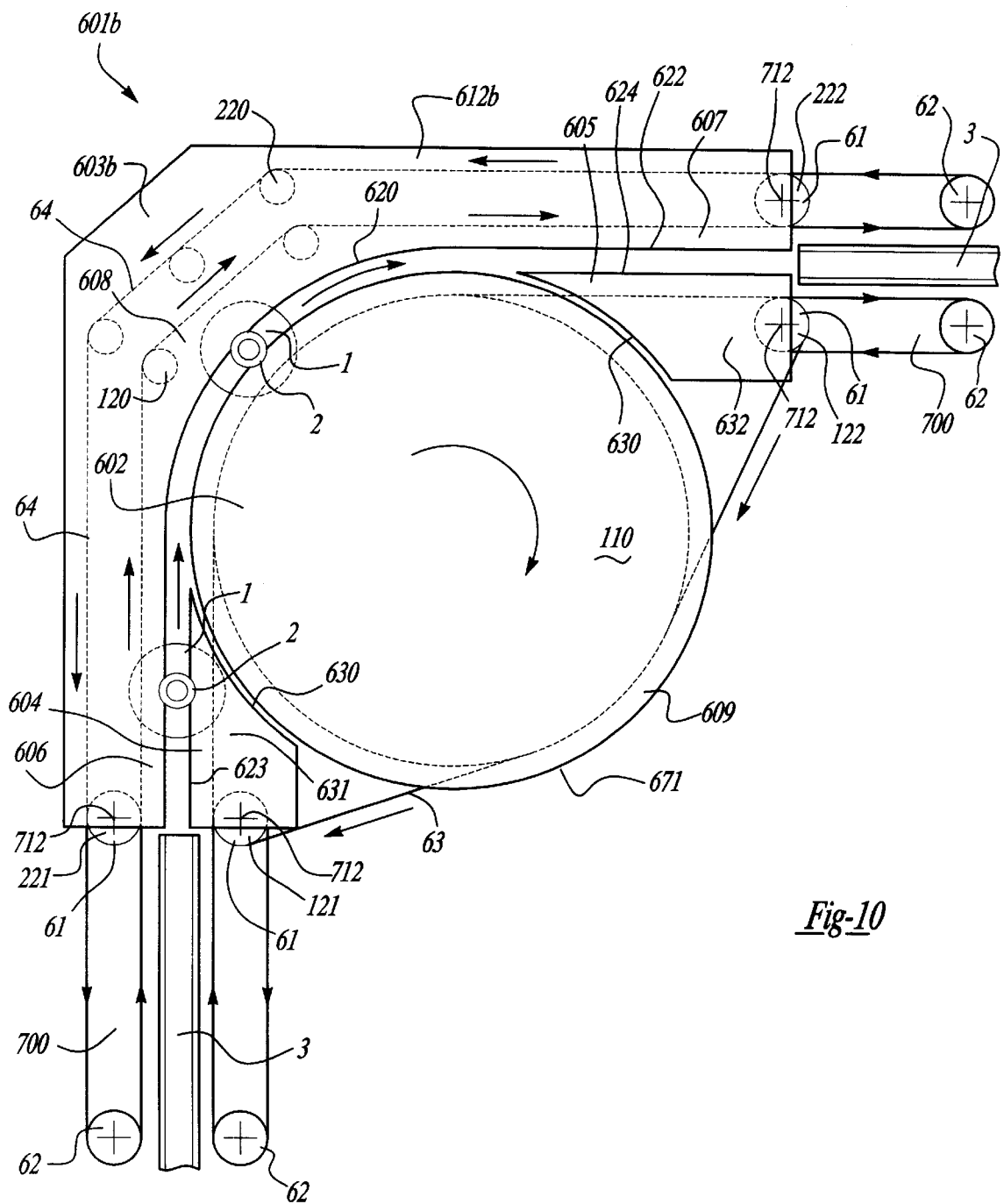
FIG. 10 illustrates, in plane view, the general components and layout of an embodiment of the invention comprising a modular angular conveyor portion comprising a turning angle of 90°.

In another embodiment, with reference to FIGS. 9 and 10, a modular angular conveyor portion, (601a) and (601b) respectively, enables said containers (1) to be transported through an arc of angle of 180° and 90°, respectively, said modular angular conveyor portion, (601a) and (601b) respectively, being connectable in series with other conveyors or other conveyor modules, as hereinafter described. Said modular angular conveyor portion, (601a) or (601b), comprises an inner portion (602) and an outer portion (603a) or (603b), respectively. Said outer portion, (603a) or (603b), comprises outer plate, (612a) or( 612b) respectively, having a static arcuate rail (608) and corresponding edge (620), wherein said edge (620) comprises an arc subtending an angle of 180° or 90°, respectively. Said outer plate, (612a) or (612b), further comprises said series of idlers (120) together with a second series of idlers (220), an entry pulley (221) and an exit pulley (222) of suitable diameters, around which endless moving-belt (64) may be further looped to form a closed circuit. Optionally, at least one of said idlers (120) and/or said idlers (220) may be spatially adjustable in order to regulate tension in said endless moving belt (64). Similarly, said inner portion (603) comprises a circular rotatable rail (609), and further comprises a closed circuit for said inner endless moving belt (63) by looping same around an entry pulley (121) and an exit pulley (122) as well as said auxiliary pulley (110), wherein said inner pulley (121) said outer pulley (122) and said auxiliary pulley (110) are preferably structurally interconnected. Optionally, said endless moving belt (63) may be further looped around a further spatially adjustable idler (not shown) in order to regulate tension in said endless moving belt (63). Furthermore, said inner portion (602) and outer portion, ((603a) or (603b)), further comprise rectilinear static parallel entry rails (604) and (606) respectively, and rectilinear static parallel exit rails (605) and (607), respectively. Said entry rail (606) and exit rail (607) comprise edges (621) and (622), respectively, essentially tangential to said curved edge (620) of said arcuate rail (608) at entry and exit thereof, respectively. Thus, said outer plate, ((612a) or (612b)), further comprises a rectilinear edges (621) and (622) leading into and trailing from, respectively, curved edge (620). Said inner portion (602) further comprise floating inner static rail sections (631) and (632), at entry and exit to said inner portion (602).

Each of said static rail sections (631) and (632) comprise a preferably curvilinear edge (630) facing rotatable edge (671) of said auxiliary pulley (110) and having a suitable clearance with respect thereto, and further comprise a substantially rectilinear edges (623) and (24) parallel to said edges (621) and (622). Preferably, said inner portion (602) and said outer portion, ((603a) or (603b)), are structurally interconnected. Thus, the modular angular conveyor portion, (601a) or (601b), may be connected in series to other modular conveyor portions of similar or different turning angle 0, and/or to a separate rectilinear conveyor as hereinbefore described. In particular, the said modular angular conveyor portion, (601a) or (601b), may be advantageously connected to the said modular conveyor propulsion modules (700), wherein said entry pulley (221) and (121) may be overlapping fitted on same shafts (712) as corresponding first terminal pulleys (61) of an adjacent leading said conveyor propulsion module, (700) and said exit pulleys (222) and (222) may similarly be connected to corresponding second terminal pulleys (62) of an adjacent trailing said conveyor propulsion module (700), in a similar manner to the connection in series of two adjacent conveyor propulsion modules, as hereinbefore described, mutatis mutandis.

The present invention further relates to a propulsion system wherein the said mechanical force acts directly on the said containers at an area of contact between suitable mechanical contact means and the said containers.

Thus, in a second embodiment of the invention, the transfer of forward momentum to the said containers (1) is achieved by the direct application of mechanical force on the said containers (1) at the area of contact between suitable mechanical contact means (500) and the said containers (1).

The present invention also relates to a propulsion system for a conveyor therein said suitable mechanical contact means comprises a series of brushes suitably mounted on at least one endless moving belts.

Figure 11:
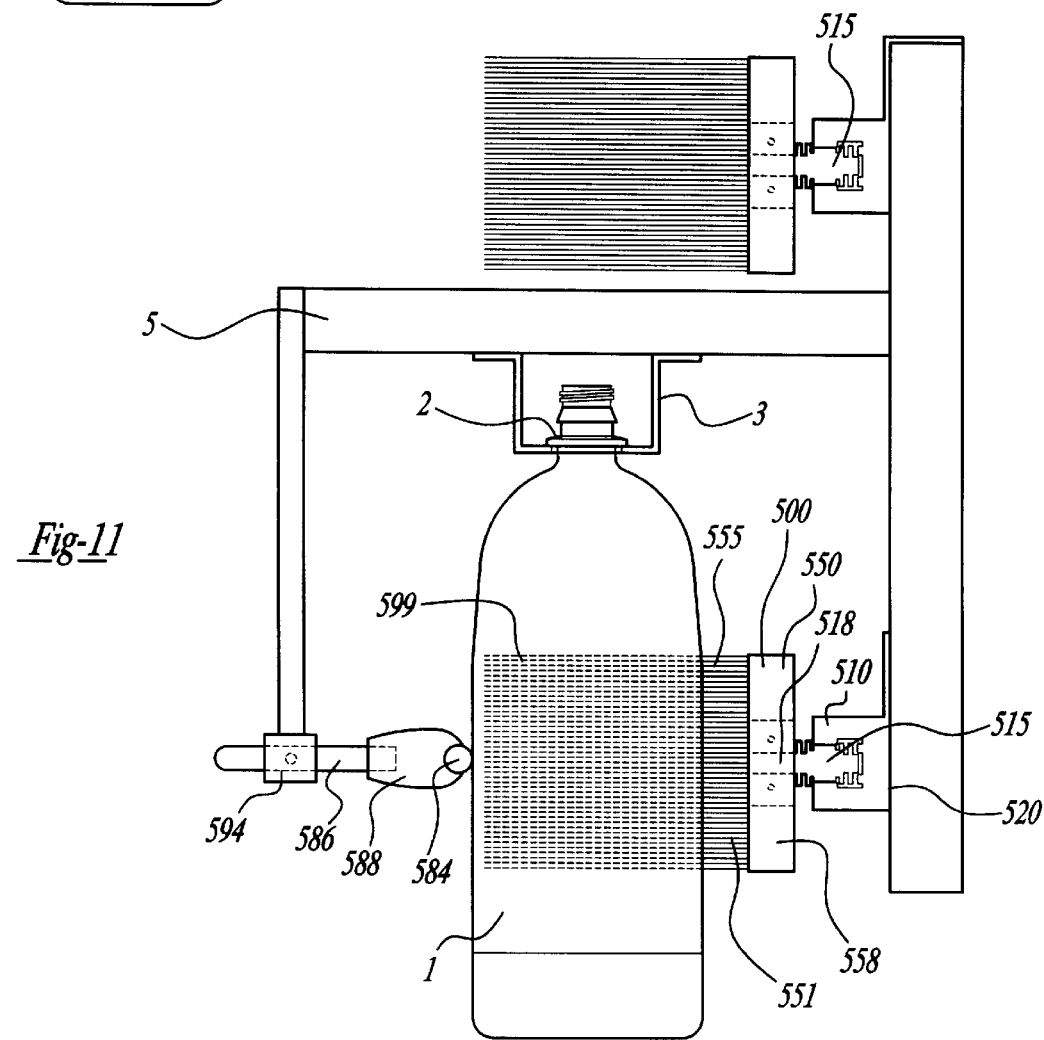
FIG. 11 illustrates, in transverse cross-sectional view, the general components and layout of an embodiment of the invention comprising mechanical contact means comprising a series of brushes mounted on an endless moving-belt, wherein the circuit described by the said moving belts is in the vertical plane.
Figure 12:
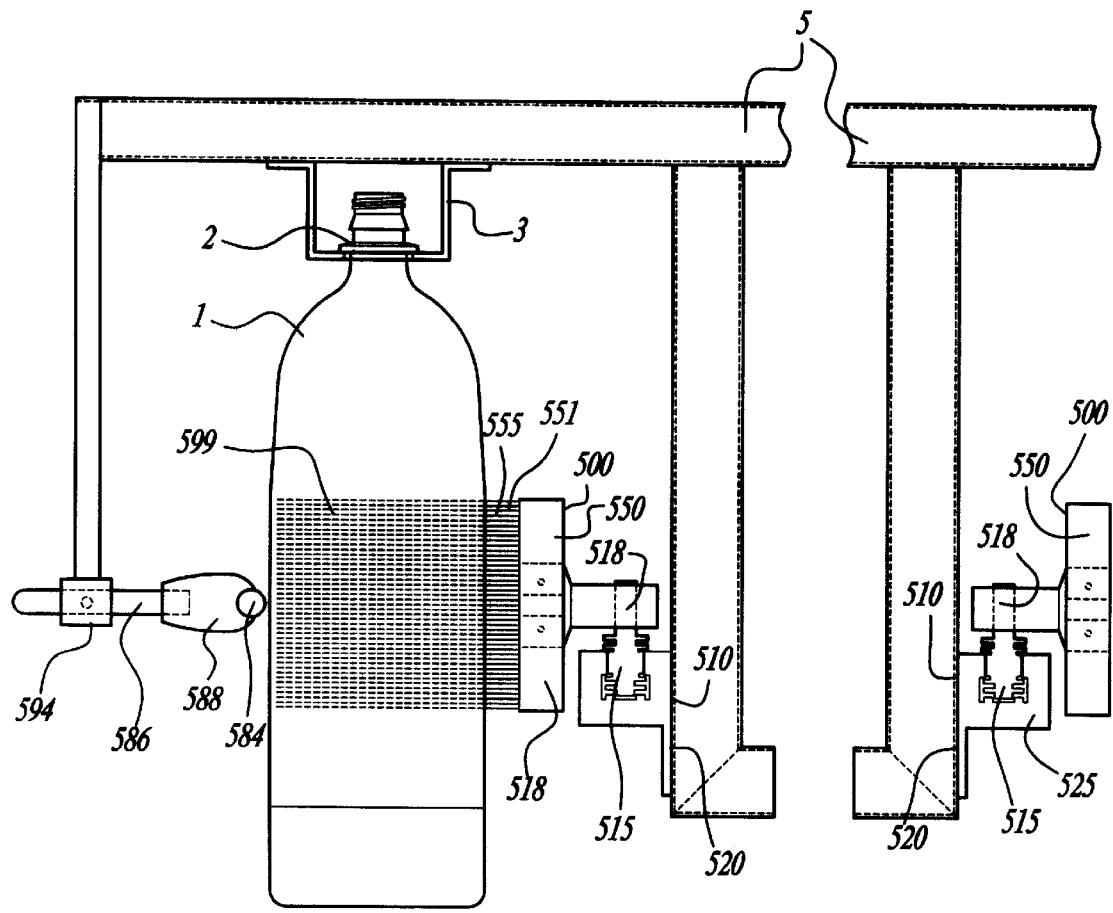
FIG. 12 illustrates, in transverse cross-sectional view, the general components and layout of an embodiment of the invention comprising mechanical contact means comprising a series of brushes mounted on an endless moving-belt, wherein the circuit described by the said moving belt is in the horizontal plane.

Thus, in another form of the invention, the said suitable mechanical contact means (500) comprises a series of brushes (550) suitably mounted on at least one endless moving-belt arrangement (510) running alongside the said conveyor rail structure (3), wherein the circuit (520) described by the said endless moving-belt arrangement (510) comprises at least one longitudinal part (530) substantially parallel to the longitudinal axis (100) of the said conveyor rail structure (3). FIGS. 11 and 12. The said endless moving-belt arrangement (510) comprise an endless moving belt (515) and pulley means to enable the said endless moving-belt (515) to rotate around the said circuit (520). Said pulley means are known in the art, and an example comprising terminal pulleys is described hereinbefore. In Preferred form of the invention, the said endless moving-belt arrangement (510) is mounted onto the conveyor rail support structure (5), using suitable mounting means known in the art. Preferably, said mounting means may further comprise suitable retrofitting means, wherein said embodiment of the invention may be installed on existing conveyors which may previously have been operated using an air-propulsion system. Said suitable retrofitting means are known in the art and may comprise adapting the said suitable mounting means to an existing conveyor support rail structure. The said endless moving belt arrangement (510) may be mounted onto the conveyor rail support structure (5) such that the circuit (520) described by the said moving belt (515) is in the vertical plane (see FIG. 11). Alternatively, in a preferred form of the invention, the said endless moving belt arrangement may be mounted onto the conveyor rail support structure (5) such that the said circuit (520) described by the said moving belt (515) is in the horizontal plane (see FIG. 12), thereby affording the user the option of operating a second parallel conveyor on the return leg (525) of the said circuit (520), but in the opposite direction to the said conveyor.

The present invention also relates to a propulsion system for a conveyor wherein said endless moving belt is a chain belt.

Said endless moving belt (515) is made from any suitable material, which may be synthetic or natural, and which is preferably flexible, strong, durable and optionally partially elastic. Suitable materials are known in the art, comprising for example rubber, and synthetic polymers and resins, such as, for example, polypropylene. Preferably, the said endless moving belt (515) may have any suitable cross-sectional shape which are known in the art, and said suitable shape may comprise for example a substantially rectangular cross-section. Additionally, the said endless moving-belt (515) may be substantially smooth or alternatively, the said endless moving-belt (515) may be toothed. In a preferred form of the invention, the said endless moving belt is a chain belt made from suitable materials known in the art, including metal. The said endless moving-belt (515) additionally comprises a series of mounting means located at a predetermined and preferably adjustable pitch along its perimeter thereof, whereupon the said series of brushes (550) are mounted. Said mounting means are known in the art and may comprise a series of suitable mounting pins (518) attached to the said endless moving-belt (515) by any appropriate means known in the art which is applicable to the said material and design of the said endless moving belt (515), such as for example bolting.

In a preferred form of the invention, each said brush (550) defines a substantially planar contact surface (551) comprised of suitable bristles (555) mounted to a brush support bracket (558), by suitable mounting means known in the art. The said support bracket (558) is suitably mounted onto the said endless moving-belt (515) at the corresponding mounting pin (518), wherein each said brush (550) presents said planar surface (551) transversely with respect to the conveyor rail structure longitudinal axis (100), when the said brush (550) is carried along the longitudinal part (530) of the circuit (520) described by the endless moving belt (515), Said longitudinal part (530) is located below, and transversely offset with respect to, the said conveyor rail structure (3), wherein the said bristles (555) on each said brush (550) carried on said endless moving-belt (515) along the longitudinal part (530) of the circuit is in contact with a container (1) at an area of contact (599), thereby transferring linear momentum from the said brush (550) onto said container (1). Preferably, said contact with said container (1) is optimised to achieve maximum transfer of momentum. Momentum is generated and transferred to the said endless moving belt (515), and hence to the said brushes (550), by suitable momentum generation and momentum transfer means, which are known in the art, and examples of which are hereinbefore described.

The area of contact (599) between each brush (550) and container (1) is chosen somewhere along the height of the said container (1), defined from below the said annular ring (2) to the bottom of the said container, though preferably, it is approximately located on the upper half of the said height.

As shown on FIGS. 11 and 12, an embodiment of the invention comprising the said suitable mechanical contact means (500) may optionally further comprise at least one optional longitudinal guide rod (584), wherein the said longitudinal guide rod (584) is of substantially the same length at he longitudinal part (530) of the said circuit (520), and is transversely offset with respect to the said longitudinal part (530), wherein the conveyor rail section (3) is located between said longitudinal part (530) and the said longitudinal guide rod (584). The said longitudinal guide rod (584) may assist in stabilising long containers, and may substantially reduce snagging. Said longitudinal guide rod (584) may be fixed or adjustable, and may be mounted to the conveyor support structure (5) by any suitable mounting means available in the art. Said suitable mounting means may comprise for example a connecting element (586) between a guide clamp (588) which clamps the said longitudinal guide rod (584), and a mounting bracket (594) mounted onto the said conveyor support structure (5). The present invention also relates to a propulsion system for a conveyor wherein the said transfer means are in modular form.

In a preferred form of the embodiment, the said conveyor propulsion means is assembled from suitable modular means. Said suitable modular means may comprise a series of conveyor propulsion modules, wherein each said conveyor propulsion module comprises suitable mechanical contact means (500) mounted onto the rail support structure (5) by suitable and optionally retrofittable mounting means, wherein momentum is transferred to each said brush (550) and endless moving belt (515) in each said conveyor propulsion module by suitable momentum generation means and suitable transfer means, as hereinbefore described. Thus, each said conveyor propulsion module is mounted longitudinally in series along the conveyor, wherein by varying the pitch between corresponding terminal pulleys for each of the said conveyor propulsion modules, it is possible to successfully install said suitable modular means on existing conveyors of any length, comprising not only straight runs but also curved runs. In one form of the invention comprising conveyor propulsion modules, each consecutive pair of said conveyor propulsion modules is separated by a suitable longitudinal clearance gap substantially avoiding interference between said pair of conveyor propulsion modules.

The present invention also relates to a propulsion system for the transportation of uniform items in a conveyor, characterized in that the said propulsion system comprises generation means for the generation of momentum and suitable transfer means for the transfer of said momentum from said generation means to the said uniform items, wherein the said transfer means comprises means for applying mechanical force to the said containers.

The present invention also relates to a propulsion system for the transportation of uniform items in a conveyor, wherein said uniform items comprise a neck portion and are supported by suitable neck-support means, and characterized in that the said propulsion system comprises generation means for the generation of momentum and suitable transfer means for the transfer of said momentum from said generation means to the said containers, wherein the said transfer means comprises means for applying mechanical force to the said containers.

Thus, although the embodiments described hereinbefore have been related to conveyors wherein containers are supported by neck-support means, it is considered that the present invention may be used by a man of ordinary skill in the art for the transportation of containers and a plurality of other uniform items on conveyors comprising alternative support means, for example base-support means, and particularly on conveyors wherein transportation of said containers and plurality of other uniform items is effected in single-file.

I claim:

1. A propulsion system for the transportation of uniform items in single file in a conveyor unit, wherein the uniform items comprise a neck portion having a ring portion protruding therefrom, comprising:

suitable neck support means for supporting the uniform items at the neck portion, comprising a suitably supported pair of substantially parallel flanges defining a parallel gap therebetween, said gap being correlated to the width of the neck portion including a suitable clearance, the ring portion of the neck portion being wide than said gap, the uniform items being supported via load-bearing contact of the ring portion on said flanges; and an endless moving belt arrangement on at least one side of the uniform items and in frictional contact therewith for transferring momentum from momentum generation means to the uniform items, said endless moving belt arrangement comprising at least one endless moving belt looped around terminal pulleys; and disengagement means for disengaging said moving belt arrangement from the uniform items thereby preventing said momentum generation means from transferring momentum to the uniform item.

2. A propulsion system as claimed in claim 1, wherein said uniform items comprise fillable containers including bottles.

3. A propulsion system for a conveyor as claimed in claim 2, wherein said neck-support means comprise a suitably parallel pair of substantial horizontal flanges having facing edges defining a parallel gap therebetween, said gap being correlated to the width of said neck portion including a suitable clearance, said neck portion comprising a ring portion of width substantially greater than said width of said neck portion including said clearance, said uniform items being supported via load bearing contact of said ring portion on said neck-support means.

4. A propulsion system for a conveyor as claimed in claim 3, wherein at least one portion of said parallel flanges comprise substantially rectilinear facing edges.

5. A propulsion system for a conveyor as claimed in claim 3, wherein at least one portion of said flanges comprise curved facing edges.

6. A propulsion system for conveyor as claimed in claim 5, wherein in at least a parallel portion of said flanges, said facing edges define an outer and an inner parallel arcs of corresponding concentric circles.

7. A propulsion system for a conveyor as claimed in claim 6, wherein said circles are horizontal and co-planar.

8. A propulsion system for a conveyor as claimed in claim 1, wherein said neck-support means comprise a suitably supported parallel pair of substantially horizontal flanges having facing edges defining a parallel gap between, said gap being correlated to the with of said neck portion including a suitable clearance, said neck portion comprising a ring portion of with substantially greater than said width of said neck portion including said clearance, said containers being supported via load bearing contact of said ring portion on said neck-support means.

9. A propulsion system for a conveyor as claimed in claim 1, wherein said endless moving belt arrangement comprises endless moving belts looped around terminal pulleys.

10. A propulsion system for a conveyor as claimed in claim 3, wherein both said flanges are static.

11. A propulsion system for a conveyor as claimed in claim 10, further including transfer means in modular form comprising at least one conveyor propulsion module.

12. A propulsion system for a conveyor as claimed in claim 11, wherein said disengagement means enable each said conveyor propulsion module to be independently disengaged.

13. A propulsion system for a conveyor as claimed in claim 6, wherein the said flange comprising said edge defining said outer arc is static and said flange comprising said edge defining said inner arc may rotate about the centre of said concentric circles.

14. A propulsion system for a conveyor as claimed in claim 13, wherein said flange comprising said edge defining said inner arc constitutes the circumferential perimeter of an upper surface of a rotatable auxiliary pulley having its centre concentric with said centre of said concentric circles.

15. A propulsion system for a conveyor as claimed in claim 14, wherein at one of said endless moving belts is further looped around said rotatable auxiliary pulley.

16. A propulsion system for a conveyor as claimed in claim 9, wherein said endless moving belt arrangement is made from synthetic or natural materials.

17. A propulsion system for a conveyor as claimed in claim 16, further including transfer means in modular form comprising at least one conveyor propulsion module.

18. A propulsion system for a conveyor as claimed in claim 17, wherein said disengagement means enable each said conveyor propulsion module to be independently disengaged.

19. A propulsion system for a conveyor according to claim 1, wherein said propulsion system is retrofittable on existing conveyors.

20. The propulsion system as claimed in claim 1, wherein each said terminal pulley comprises a shaft pivotable about a suitable pivot point above the corresponding pulley, and said disengagement means comprises a suitable jack and return spring arrangement suitably mounted onto a pair of terminal pulleys above or below said pivotal points, such that when the jack is actuated the corresponding shaft and pulley are deflected from said neck support means, and when the jack is released said return spring returns to the corresponding shaft and pulley to their original position.

* * * * *